(12) United States Patent
Shivji et al.

(10) Patent No.: US 7,233,557 B2
(45) Date of Patent: Jun. 19, 2007

(54) METHOD FOR IDENTIFYING LOCATION ON AN OPTICAL DISK

(75) Inventors: Shane Shivji, Corvallis, OR (US);
Mitch Hanks, Fort Collins, CO (US);
Kevin L. Colburn, Greeley, CO (US);
Mike Salko, Eugene, OR (US);
Andrew Koll, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 629 days.

(21) Appl. No.: 10/856,574

(22) Filed: May 28, 2004

(65) Prior Publication Data
US 2005/0266413 A1 Dec. 1, 2005

(51) Int. Cl.
*G11B 5/55* (2006.01)
*B41J 2/47* (2006.01)

(52) U.S. Cl. ................................. 369/53.29; 347/253

(58) Field of Classification Search ............... 347/253, 347/19, 224, 225; 369/53.29; 358/1.5, 1.12, 358/1.1, 1.18
See application file for complete search history.

(56) References Cited

U.S. PATENT DOCUMENTS

| | | | |
|---|---|---|---|
| 5,296,942 A * | 3/1994 | Yokoyama et al. ......... 358/461 |
| 6,992,962 B1 * | 1/2006 | Mashimo et al. ......... 369/53.31 |
| 7,159,776 B2 * | 1/2007 | Pratt ........................... 235/454 |
| 2002/0114265 A1 * | 8/2002 | Hart et al. ................. 369/275.5 |
| 2002/0191517 A1 | 12/2002 | Honda et al. |
| 2003/0108708 A1 * | 6/2003 | Anderson et al. .......... 428/64.4 |
| 2004/0088654 A1 * | 5/2004 | Uotani ........................ 715/526 |
| 2005/0078324 A1 * | 4/2005 | Koll et al. .................... 358/1.5 |
| 2007/0025234 A1 * | 2/2007 | Takazawa et al. ....... 369/275.5 |

FOREIGN PATENT DOCUMENTS

| | | |
|---|---|---|
| EP | 1439537 | 7/2004 |
| EP | 1515318 | 3/2005 |
| JP | 2006279570 A * | 10/2006 |

OTHER PUBLICATIONS

International Search Report dated Sep. 27, 2005 (1 page).

* cited by examiner

*Primary Examiner*—William Korzuch
*Assistant Examiner*—Parul Gupta

(57) ABSTRACT

A method is disclosed for positioning an optical labeling mechanism substantially close to a particular track of a labeling surface on an optical disk. The method can include the operation of positioning the optical labeling mechanism adjacent to the particular track. A further operation can be measuring a first surface texture of the labeling surface using the optical labeling mechanism. Another operation can involve positioning the optical labeling mechanism adjacent to a different track. A further operation can be moving the optical labeling mechanism from the different track toward the particular track location. Another operation can involve measuring a second surface texture of the labeling surface using the optical labeling mechanism. A further operation can be comparing the first and second surface textures to determine if the optical labeling mechanism is positioned substantially near the particular track.

54 Claims, 4 Drawing Sheets

METHOD FOR IDENTIFYING LOCATION ON AN OPTICAL DISK

FIELD OF THE INVENTION

The present invention relates generally to identifying location on an optical disk.

BACKGROUND OF THE INVENTION

Optical disks represent a significant percentage of the market for data storage of electronic information including photographic, video, and/or audio data. Typically, optical disks have data patterns embedded thereon that can be read from one side of the disk, and a graphic display printed on the other side of the disk. Various optical disk formats are currently available such as CD, CD-ROM, CD-R, CD-RW, DVD, DVD-R, DVD-RW, DVD+R, and DVD+RW. Other optical disk formats are also available.

In order to identify the contents of the optical disk, printed patterns or graphic display information can be provided on the non-data side of the disk. The patterns or graphic display can be both decorative and provide pertinent information about the data content of the disk. In the past, commercial labeling has been routinely accomplished using screen-printing methods. While this method can provide a wide variety of label content, it tends to be cost ineffective for production of less than about 400 disks because of the fixed costs associated with preparing a stencil or combination of stencils and printing the desired pattern or graphic display.

In recent years, the significant increase in the use of optical disks for data storage by consumers has increased the demand to provide customized labels to reflect the content of the optical disk. Most consumer available methods of labeling are limited to either handwritten descriptions or pre-printed labels which may be affixed to the disk. Unfortunately, preprinted labels can adversely affect the disk performance upon spinning at high speeds.

Recently, a variety of electromagnetic radiation responsive dye compositions have been investigated for use on optical disks. An optical disk coated with a radiation responsive dye on the side of the optical disk which does not store data can have an image developed on the optical disk using an emitter in an optical disk drive. The image developed in the radiation responsive dye can be used by consumers for disk labeling and other uses. The existing means for controlling the location of emitters that are used in optical disk drives, however, may not be accurate enough to produce a high resolution image free of errors or distortion in the image.

SUMMARY OF THE INVENTION

A method is disclosed for positioning an optical labeling mechanism substantially close to a particular track of a labeling surface on an optical disk. The method can include the operation of positioning the optical labeling mechanism adjacent to the particular track. A further operation can be measuring a first surface texture of the labeling surface using the optical labeling mechanism. Another operation can involve positioning the optical labeling mechanism adjacent to a different track. A further operation can be moving the optical labeling mechanism from the different track toward the particular track location. Another operation can involve measuring a second surface texture of the labeling surface using the optical labeling mechanism. A further operation can be comparing the first and second surface textures to determine if the optical labeling mechanism is positioned substantially near the particular track.

DETAILED DESCRIPTION

Figure 1:
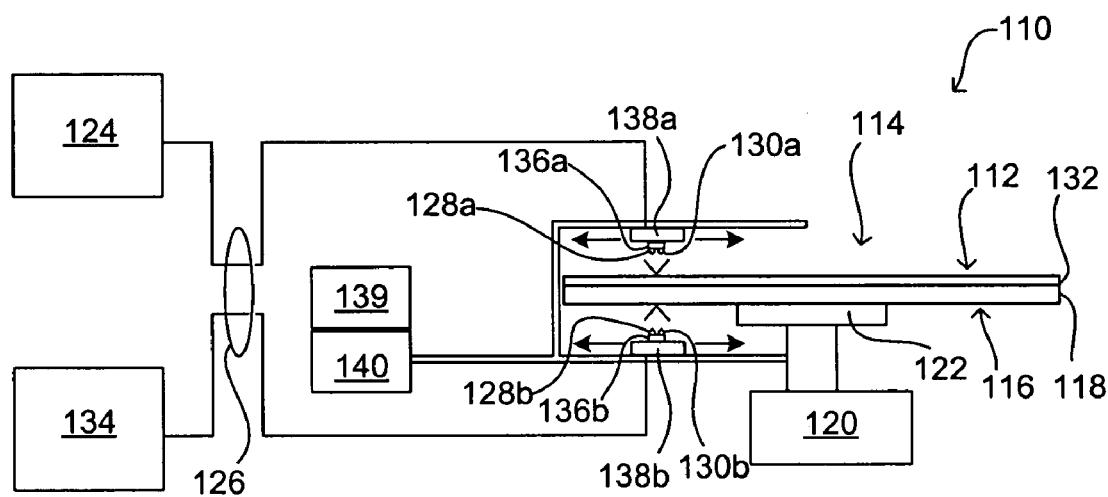
FIG. 1 is a diagram showing a system for sampling texture samples on an optical disk in accordance with an embodiment of the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention can provide an improvement in image quality by eliminating empty space or doubly marked areas in an image printed on an optical disk by an emitter in an optical disk drive. The improvement in image quality can be achieved with no additional hardware costs.

As illustrated in FIG. 1, a system is provided for sampling textures on an optical disk having a radiation responsive dye composition thereon, indicated generally at 110, in accordance with the present invention. In this embodiment, the system can simultaneously write to the image side 112 of an optical disk, which is the non-data side of an optical disk 114 and may also collect and/or write data to the data side 116 of the optical disk. The optical disk substrate 118 is shown in a first orientation, with the image side 112 facing in an upward direction. A motor 120 and a support member 122 are present for spinning and supporting the optical disk 114.

As used herein, "optical disk" is meant to encompass audio, video, multi-media, and/or software disks that are machine readable in a CD, DVD, other optical disk drive, or the like. Examples of optical disk formats include writeable, recordable, and rewriteable disks such as DVD, DVD-R, DVD-RW, DVD+R, DVD+RW, CD, CD-ROM, CD-R, CD-RW, Blue Ray and the like. Other like formats may also be included, such as similar formats and formats to be developed in the future.

In accordance with the present invention, an image can be digitally stored on image data source 124. This image information can be generated using any number of commercially available image software programs. The image can then be rasterized or spiralized and delivered to a labeling source via signal processor 126. This process generally involves digitizing image data to correspond to a spiral path that matches the path followed by the labeling source with respect to the image side of the optical disk while spinning.

In one embodiment, the labeling source is an emitting device 128a and an optional detecting device 130a facing the image side 112 of the spinning optical disk 114. The optical disk can have a radiation-responsive dye composition 132 enabling the emitting device 128a to irradiate the radiation-responsive dye composition in order to change the composition's color, darkness, or contrast at the point where the emitting device is focused. In one embodiment, the optical emitting device may be a laser configured to be focused on a small enough area to enable the detecting device to detect small bumps which represent data, as is commonly done on optical disks. The size of the data bumps may range from several square nanometers to several thousand square microns.

Additionally, an optional second emitting device 128b and a second detecting device 130b can face the data side 116 and are configured for simultaneous reading and/or writing operations. The data can be generated, used, and/or stored in data source 134 before it is written. In one embodiment, data can be written by sending it to the second emitting device 128b via signal processor 126. Each set of emitters and detectors are positioned on a first and second fine adjust sled 136a, and 136b. The fine adjust sleds 136a and 136b can be positioned on a first and second coarse adjust sled 138a, and 138b, respectively. Each fine adjust sled can be slidably connected to a coarse adjust sled.

As used herein, sled may include any structure or means for coarsely and finely moving an emitter or detector in an optical disk drive. Embodiments of actuators other than the fine adjust sleds and coarse adjust sleds may be used to move the emitting devices and detecting devices, so long as the emitting devices and detecting devices can be quickly and accurately moved across the surface of an optical disk in micron and sub-micron sized steps.

In this embodiment, a single coarse adjust actuator 140 is shown that can act to simultaneously cause both the first coarse adjust sled 138a and the second coarse adjust sled 138b to travel and allow the detectors to collect information in unison. A single fine adjust actuator 139 can act to simultaneously cause both the first fine adjust sled 136a and the second fine adjust sled 136b to travel across the coarse adjust sleds and allow a fine adjustment of the position of the emitters and detectors on the fine adjust sleds. However, this arrangement is not required.

In an alternative embodiment, each coarse adjust sled and fine adjust sled can be configured to be independent of the other. In such an embodiment, the use of two coarse adjust actuators and two fine adjust actuators or other mechanical or electrical structures can be implemented for independent function. Additionally, other embodiments are possible such as using a single track and solenoid combination such as those available in common CD-R/CD-RW drives. In this alternative configuration, an emitter and detector combination can be used to read and write data and then the disk can be inverted and the emitter and detector combination can be used to form an image on the label surface of the disc by irradiating the radiation-responsive dye compositions in selected locations on the surface. In order to simplify the explanation, a single emitter and detector combination will be used throughout the remaining explanation. Multiple emitter and detector combinations can be used, however, as previously discussed.

The coarse adjust sled 138b can be used in most optical disk drives to quickly move the emitter and detector combination, 128b and 130b respectively, across an optical disk. For example, the emitter and detector may be quickly moved near the outside edge of an optical disk to read data stored in that track. The coarse adjust sled can be moved so that the emitter and detector are near the location of the desired track. The fine adjust sled 136b then moves across the coarse adjust sled from a first side of the coarse adjust sled to a second side of the coarse adjust sled. The fine adjust sled may be used to move the emitter and detector to a location on the optical disk 114 substantially near the beginning of the track, allowing the emitter and detector to read/write the data stored on the optical disk.

When an optical disk drive 110 is used to read data on an optical disk 114, such as when all the songs are listened to on a CD or a movie is watched on a DVD, most optical disk drives function by placing the coarse adjust sled 138b near the first track located near the inside of the optical disk. The fine adjust sled 136b can then be used, in conjunction with the emitter and detector, 128b and 130b, to locate the beginning of a first track and follow the spiraling track as it moves from the inside of the optical disk to the outside, similar to a needle in a vinyl record following the spiraling groove (although a record is operated from the outside to the inside). When the fine adjust sled advances to the opposite side of the coarse adjust sled, the coarse adjust sled can be moved a specific width across the optical disk and the fine adjust sled can be returned back to the first side of the coarse adjust sled and can resume reading the data on the optical disk.

In one embodiment of the present invention, the emitter 128b in the optical disk drive 110 can be used to irradiate predetermined portions of an electromagnetic radiation responsive dye 132, the dye having been placed on the image side 112 of an optical disk 114 in order to form an image. When reading data on the data side 116 of an optical disk, the spiral track of data comprising small bumps can be used to verify that the coarse adjust sled 138b and fine adjust sled 136b have been moved to the correct location. The data track can also be used to correct any errors in the movement of the sleds as they follow the data spiral. There are usually no data bumps, however, on the image side of an optical disk. The method of using data bumps in the spiral data track to verify and correct errors in movement of the coarse adjust sled cannot generally be used to verify and correct errors in movement on the image side of the optical disk.

In one embodiment, location on the image side of an optical disk can be determined by sampling the texture of the radiation-responsive dye composition 132. A rotational area on an optical disk can be sampled using the emitter 128b and detector 130b. The texture at each track on the optical disk can have a unique texture signature. The texture signature can be caused by variations in the thickness and density of the radiation-responsive dye composition. As the emitter and detector are moved further from the sampled location, the change in the unique texture signature can increase. As the emitter and detector are moved toward the sampled location, the change in the unique texture signature will decrease. By comparing texture signatures, it can be determined whether the emitter and detector are moving toward or away from a previous texture signature. It can also be determined if the emitter and detector are substantially near the location where the previous texture signature.

Figure 2:
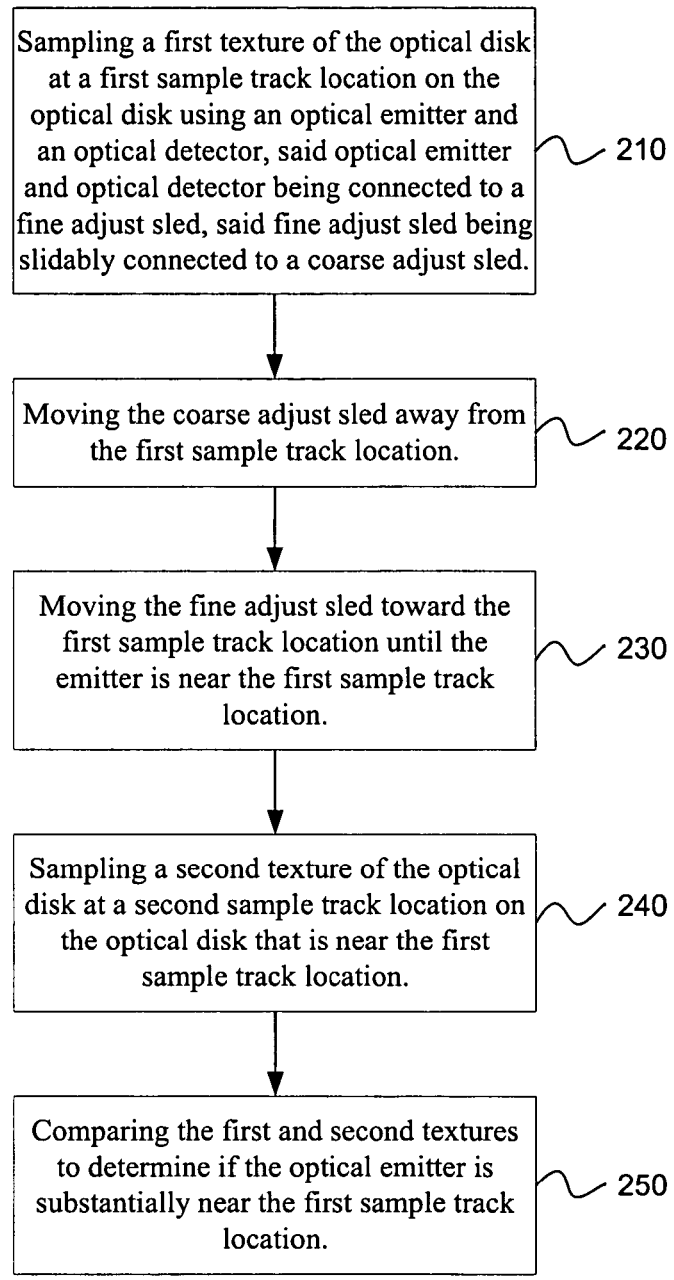
FIG. 2 is a flow chart depicting a method for identifying distances from a sample track location on a non-data side of an optical disk in an embodiment of the present invention.

One embodiment of the invention provides a method for identifying a location substantially close to a previously sampled track location on an optical disk 114 having a radiation responsive dye 132, and identifying said location using an optical emitter 128b and an optical detector 130b, said optical emitter and optical detector being connected to a fine adjust sled 136b, said fine adjust sled being adjustably connected to a coarse adjust sled 138b as described in the flow chart of FIG. 2. By way of example, the disc disclosed in FIG. 3 will be referenced in connection with the method shown in FIG. 2. The method includes the operation of sampling a first texture of the optical disk at a first sample track location on the optical disk using an optical emitter and an optical detector, said optical emitter and optical detector being connected to a fine adjust sled, said fine adjust sled being slidably connected to a coarse adjust sled, as shown in block 210.

The fine adjust sled can be used to move the emitter and detector across the surface of the optical disk. When the fine adjust sled nears the second side of the coarse adjust sled, the emitter and detector can be used to measure a first texture sample at that location. The first texture sample can be measured by using the emitter to emit photons onto the surface of the optical disk. The intensity of the reflection of the photons from the surface of the optical disk can then be measured by the detector. Any measurement that can enable an emitter and detector to detect the texture of an optical disk may be used, such as a sum signal or a Focus Error Signal (FES). The sum signal and FES signal are commonly used by optical disk drives to record information about an optical disk.

Figure 3:
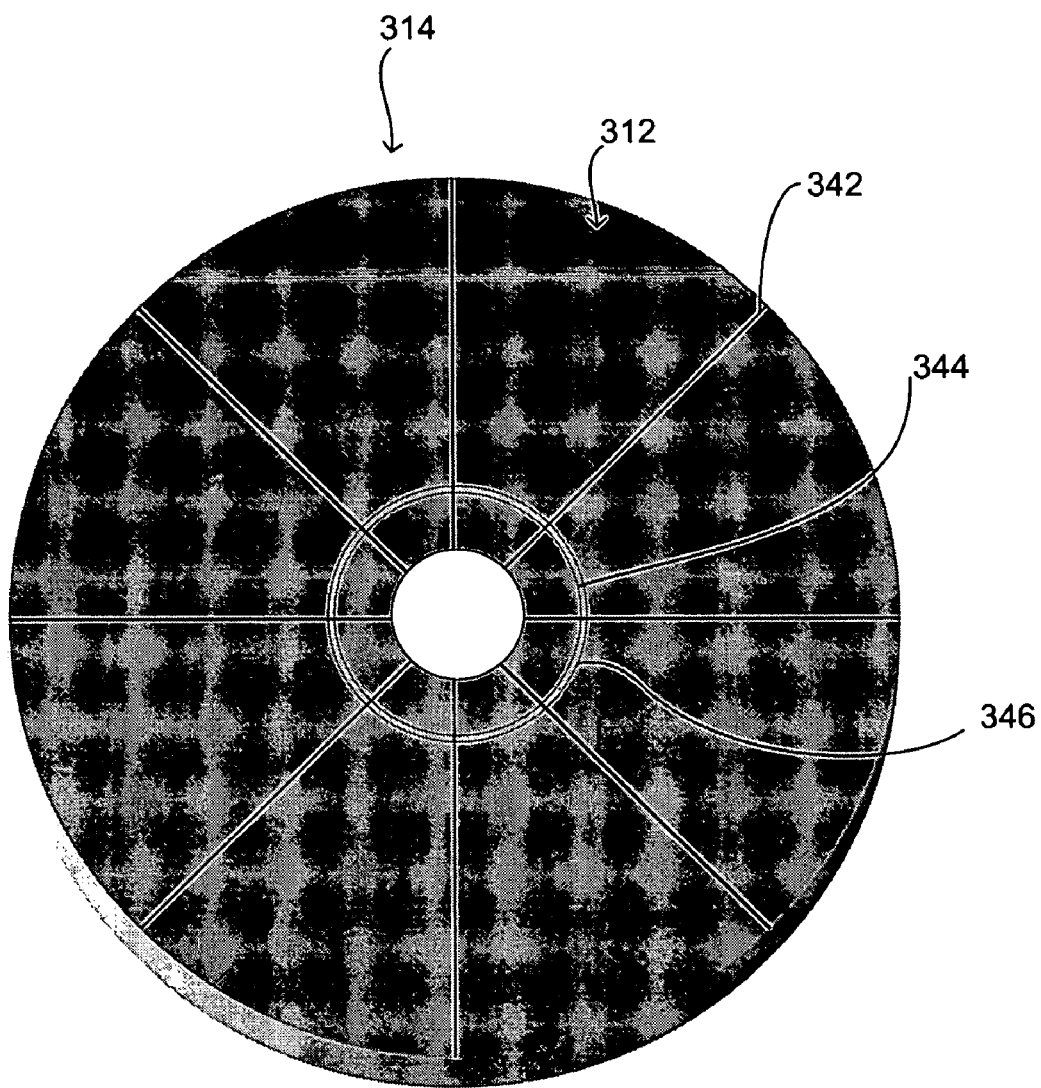
FIG. 3 is diagram showing an example of an optical disk in an embodiment of the present invention.

In one embodiment of the present invention, the emitter and detector can be used to measure a texture sample at spoke points along the optical disk. As shown in FIG. 3, physical lines called spokes 342 can be placed on the image side 312 of an optical disk 314. The spokes may be visible only at the frequencies used by the optical disk drive. The spokes can be used by the optical disk drive to control the velocity at which the optical disk is spinning. The image side of an optical disk can comprise a plurality of spokes. For example, 400 spokes can be placed on the optical disk, each spoke directed to the center of the optical disk, and separated by 0.9 degrees. The texture sample can be measured at a first sample track location 344 at the spoke points, which is the point at which the spokes and sample track intersect. Thus, the first texture sample may comprise 400 measurements for the intensity of the reflection of photons off the surface of the optical disk at the points where the spokes intersect the sample track. Those measurements can be recorded for later use. Alternatively, the measurements may be made on optical disks that do not contain spokes on the image side of the optical disk. In this embodiment, a plurality of measurements may be made that are a specific distance apart.

The method in FIG. 2 further includes operation 220 that involves moving the coarse adjust sled away from the first sample track location 344 (FIG. 3). The coarse adjust sled may move either toward the outside of the optical disk or toward the inside. However, it is presumed in this embodiment that the coarse adjust sled will move from the inside of the optical disk toward the outside. Once a texture sample has been measured at location 344 and recorded, the coarse adjust sled can be moved a predetermined distance. The distance the coarse adjust sled may be moved may be limited by the distance the fine adjust sled can move across the coarse adjust sled. For example, the coarse adjust sled may be 1000 microns wide and the fine adjust sled may be able to move 750 microns across the coarse adjust sled in which case the coarse sled is moved a maximum of 750 microns. The coarse adjust sled also may be moved less than the maximum amount that the fine adjust sled can be moved.

The method additionally includes the operation illustrated in 230 that involves moving the fine adjust sled back toward the first sample track location 344 until the emitter and detector are near the first sample track location. Ideally, when the fine adjust sled has moved as far as possible across the coarse adjust sled, with just one more possible track movement, a first texture sample measurement will be made at the last possible track location by the emitter and detector, as described in 210. The last possible location will typically be free from any printed portion of the image. The coarse adjust sled can then be moved the distance that the fine adjust sled can move across the coarse adjust sled. The fine adjust sled can be moved back across the coarse adjust sled at 230, and the emitter and detector will be in the same location as they were before the coarse adjust sled was moved. A second texture sample measurement can subsequently be made and compared with the first, as will be described subsequently with reference to 240. The texture sample measurements can be compared, as will be described subsequently with reference to 250, and both should be identical. The emitter can then move over one track and resume printing the image.

In practice, however, errors can cause the emitter and detector to be at a slightly different location after the coarse adjust sled has been moved at 220 and the fine adjust sled has been reset back to the first side of the coarse adjust sled at 230.

Errors in the movement of the fine adjust sled and the coarse adjust sled can be caused by a less than optimal calibration, thermal effects, misplacement of poles on stepper motors, lubrication problems, and Digital to Analog Converter (DAC) precision accumulation errors on the fine adjust actuator used to move the fine adjust sled, among other problems. These errors can cause banding in the image being delivered to the image side of the optical disk by the emitter. The banding may be empty rings on the optical disk caused by the emitter being moved too far. The bands may also appear as dark rings caused by the emitter not being moved far enough.

In another embodiment, the fine adjust sled can print the last track before the coarse adjust sled is moved. The first texture sample can then be taken and recorded at the location where the last track was printed. The coarse adjust sled can then be moved and the fine adjust sled can be moved back, ideally to the same position where the last track was printed. A second texture sample can be taken. The first and second texture samples can then be compared, as will be discussed in further detail below.

The method further includes the operation in block 240 that involves sampling a second texture of the optical disk at a second sample track location on the optical disk that is near the first sample track location. The method also includes operation 250 that involves comparing the first and second texture samples to determine if the optical emitter is substantially near the first sample track location. After the fine adjust sled has been moved back across the coarse adjust sled, it is necessary to determine if the emitter is in the proper location before continuing to develop the image on the optical disk. This can be accomplished by sampling a second texture at a second sample track location. Ideally, the second sample track location will be equal to the first sample track location.

The second texture can be measured using the same method as was used for measuring the first texture sample. The emitter can emit photons onto the surface of the optical disk at the location where the second sample track location intersects the spokes. The intensity of the reflection of the photons from the surface of the optical disk can then be measured by the detector at each of the 400 spoke points. Alternatively, a much smaller number of measurements can be made, such as 20 measurements. The measurements can be recorded using software or hardware.

As mentioned, the first texture sample can then be compared with the second texture at 250. This can be accomplished using a variety of methods. In one embodiment, first and second textures taken at the same spoke can be subtracted and squared. This will give an absolute value of the difference between two measurements along the same spoke. The difference can be computed for each of the samples taken at the same spokes. Thus, if the first sample texture involved 400 samples taken at every spoke, and the second sample texture was taken at spoke multiples of 20, i.e. 1, 20, 40, 80, . . . , the first sample texture taken at spoke 1 can be subtracted from the second sample texture taken at spoke 1 and the difference can be squared. The first sample texture taken at spoke 20 can be subtracted from the second sample texture taken at spoke 20 and the difference can be squared. This can be repeated until all the differences are found and the squared differences can be added together. Alternatively, rather than squaring the difference, an absolute value may be determined for the difference between a first track sample and a second track sample. The sum of the differences can be called the Local Mean Squared Error (LMSE).

The LMSE computed between the first sample texture and the second sample texture can be compared against a threshold value. If the LMSE value is above the threshold value it is too high, this can be interpreted as meaning that the track surface at the second sample track location 346 is too dissimilar from the first sample track location 344. The fine adjust sled can be moved slightly and another plurality of samples taken at 20 spoke points. This procedure can be repeated until an LMSE value reading falls below the threshold, signifying that the emitter is substantially near the track where the pre-sled seek samples were taken.

Alternatively, after a set number of sample track locations have been sampled, the minimum LMSE may be used. For example, if 100 different sample track locations are each sampled at a plurality of spoke points, and the computed LMSE value for each of the hundred sample track locations is over the threshold value, the minimum LMSE value out of the hundred sample track locations may be used as a reference. The fine adjust sled can be placed at the sample track location corresponding to the minimum LMSE value. Once the fine adjust sled is at a location corresponding to a minimum LMSE value or an LMSE value below a set threshold, the emitter can be used to resume printing the image on the optical disk.

Figure 4:
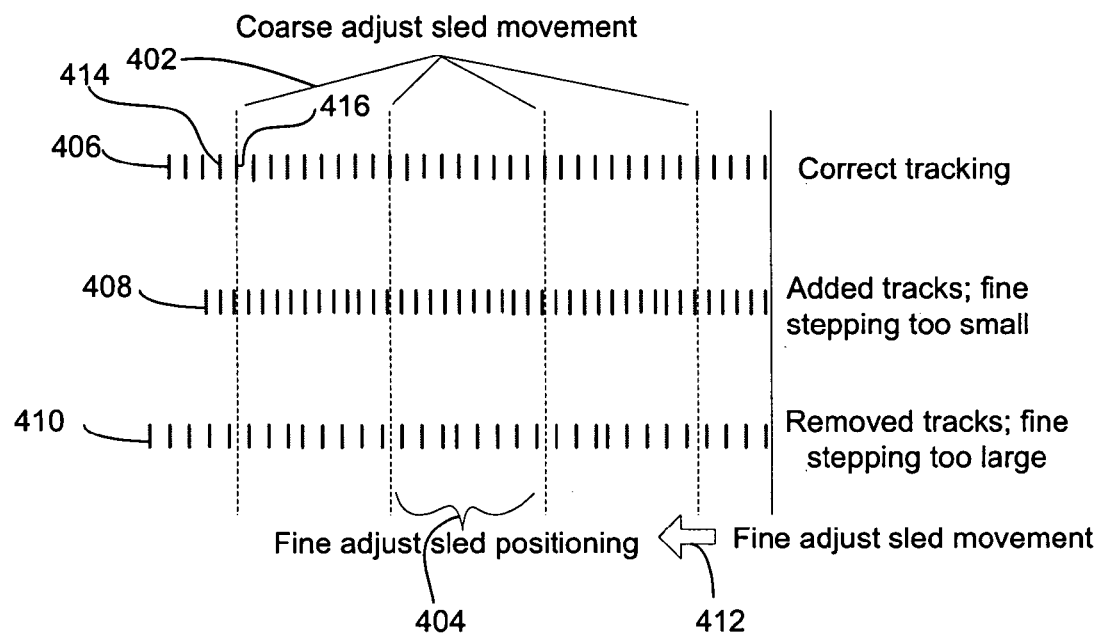
FIG. 4 is a diagram showing an example of moving a coarse adjust and fine adjust sled along tracks of an optical disk in accordance with an embodiment of the present invention.

In another embodiment, upon completion of the fine adjust sled movement and just prior to a coarse adjust sled movement, the fine adjust sled can be moved to the track just beyond the last track printed 416 by the emitter, as shown in FIG. 4. The rows of tick marks are indicative of tracks. The first sample track location can be recorded, as previously discussed, at track 416. The coarse adjust sled can then be moved and the fine adjust sled returned to the track just beyond the last track printed by the emitter. When the sample track location is found, or a location substantially close to the sample track location, by comparing LMSE values against the recorded area, the total distance traveled by the fine adjust sled across the course adjust sled can be recorded. The desired number of tracks between each coarse adjust sled movement 402 can be determined by the resolution of the image being printed. For example, the image may be printed at a resolution of 600 tracks per inch. With the desired number of tracks between each coarse adjust sled movement known and the actual distance traveled by the fine adjust sled known, an optimal fine adjust step can be determined and the fine adjust actuator used to move the fine adjust sled can be adjusted appropriately to enable correct tracking 406.

If the total distance the fine adjust sled traveled across the coarse adjust sled is closer than expected, the fine adjust sled steps may be too small 408, causing tracks to be added between coarse adjust sled movements 402. The fine adjust actuator gain can be adaptively increased to boost the distance the fine adjust sled 412 is moved each time. The gain can be the level of current used to move the fine adjust actuator. Likewise, if the distance the fine adjust sled traveled across the coarse adjust sled is further than expected, the fine adjust sled steps may be too large 410, causing tracks to be removed between coarse adjust sled movements 402. The fine adjust actuator gain can then be decreased. The amount of increase or decrease in the fine adjust actuator gain can be proportional to the difference between the actual position and the expected position.

In another embodiment, the average distance traveled during movement of the coarse adjust sled 402 can be a substantially fixed amount. Target positions for each track can be calculated with relationship to the movement of the coarse adjust sled. Since the average distance traveled by the coarse steps is known, the distance traveled during each fine step can be determined by dividing the distance traveled in a coarse step by the number of fine steps in each coarse step. The average distance can be determined for several coarse steps in order to average out any error.

For example, the sum signal can be recorded, as previously discussed, and the coarse sled movement made. The coarse sled movement may be, for example, 150 microns. The fine adjust sled can be returned approximately 150 microns to a location near the track where the sum signal was recorded. Additional sum signals can be recorded and compared with the first sum signal. If the fine adjust sled has to move further than expected to find the minimum LMSE, then it can be determined that the fine adjust steps are too large and should be decreased. Conversely, if the fine adjust sled has to reverse course and move backwards to find the minimum LMSE, it can be determined that the fine adjust steps are too small and should be increased. By altering the fine adjust steps until the LMSE is a minimum at a position substantially near where it is expected, the fine adjust sled can be calibrated. The fine adjust sled may need to be recalibrated periodically depending upon thermal and climatic conditions.

In order to keep tracks close to their absolute target position 406, the location of the first track to be printed 414 after the coarse adjust sled is moved can be adjusted by a small amount in a direction to make it closer to where it should be. Tracks can be kept close to their target positions by slightly adjusting the fine adjust sled position for each printed track to bring the tracks closer to their intended target position.

There are several different algorithms that can be applied to find the first sample track location using a minimum number of sample track locations. For example, a sample can be taken at a first sample track location. The coarse adjust sled and fine adjust sled can then be moved. A second sample can be taken at a second sample track location and the LMSE can be found between the two track locations. If the LMSE is too large, the fine adjust sled can continue to be moved with new samples being taken. If the computed LMSE values increase as the sample track location is moved outward, the fine adjust sled can be returned to the second sample track location and the fine adjust sled can be moved inward to compute LMSE values at new sample tracks inside the second sample track. Also, measurements at different spoke points or more spoke points may be attempted. For example, if the measurements at spokes that are multiples of 20 do not return an LMSE value below a set threshold, measurements of spokes that are multiples of 10 may be used to attempt to average out noise present in the previous LMSE measurements.

Once the fine adjust sled position is found using the minimum LMSE value or an LMSE value below a set threshold, the amount of current needed for the fine adjust actuator to deflect the fine adjust sled to that position can be recorded. The needed current can be used to calibrate the fine adjust sled, allowing it to be accurately moved during printing.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A method for positioning an optical labeling mechanism substantially close to a particular track of a labeling surface on an optical disk, comprising:
    positioning the optical labeling mechanism adjacent to the particular track;
    measuring a first surface texture of the labeling surface using the optical labeling mechanism;
    positioning the optical labeling mechanism adjacent to a different track;
    moving the optical labeling mechanism from the different track toward the particular track location;
    measuring a second surface texture of the labeling surface using the optical labeling mechanism; and
    comparing the first and second surface textures to determine if the optical labeling mechanism is positioned substantially near the particular track.

2. A method as in claim 1, wherein the step of measuring a first surface texture further comprises the step of taking a plurality of measurements through a substantial revolution of the optical disk.

3. A method as in claim 2, wherein the step of measuring a first texture further comprises the step of measuring a sum signal for a substantial revolution of the optical disk.

4. A method as in claim 2, wherein the step of measuring a first surface texture further comprises the step of recording a first track signal at a plurality of positions along the particular track.

5. A method as in claim 1, wherein the step of comparing the first and second surface textures further comprises the step of recording a second track signal at a plurality of positions along the different track.

6. A method as in claim 5, wherein the step of comparing the first and second surface textures further comprises the steps of:
    finding a difference between each first surface texture and each second surface texture; and
    squaring each difference and adding the difference to a local mean squared error.

7. A method as in claim 6, wherein the step of comparing the first and second surface textures further comprises the steps of:
    finding a difference between each first surface texture and each second surface texture; and
    determining the absolute value of each difference and adding the absolute value to a local mean squared error.

8. A method as in claim 7, further comprising the step of determining if the optical labeling mechanism is within a predetermined distance from the particular track by determining if the local mean square error is less than a predetermined value.

9. A method for identifying a location substantially close to a sampled track location on an optical disk having a radiation responsive dye, comprising the steps of:
    sampling a first texture of the optical disk at a first sample track location on the optical disk using an optical emitter and an optical detector, said optical emitter and optical detector being connected to a fine adjust sled, said fine adjust sled being slidably connected to a coarse adjust sled;
    moving the coarse adjust sled away from the first sample track location;
    moving the fine adjust sled toward the first sample track location until the optical emitter is near the first sample track location;
    sampling a second texture of the optical disk at a second sample track location on the optical disk that is near the first sample track location; and
    comparing the first and second textures to determine if the optical emitter is substantially near the first sample track location.

10. A method as in claim 9, wherein the step of comparing the first and second textures further comprises comparing the first texture with the second texture to determine if the optical emitter is within a predetermined distance from the first sample track location.

11. A method as in claim 9, wherein the step of sampling a first texture further comprises the step of sampling a first texture at a first sample track location wherein the first sample track location does not have a printed image.

12. A method as in claim 9, wherein the step of sampling a first texture further comprises the step of sampling a first texture at a first sample track location wherein the first sample track location has an image printed.

13. A method as in claim 9, wherein the step of sampling a first texture further comprises the step of taking a plurality of samples through a substantial revolution of the optical disk.

14. A method as in claim 13, wherein the step of sampling a first texture further comprises the step of sampling a sum signal for a substantial revolution of the optical disk.

15. A method as in claim 13, wherein the step of sampling a first texture further comprises the step of sampling a focus error signal for a substantial revolution of the optical disk.

16. A method as in claim 13, wherein the step of sampling a first texture further comprises the step of recording samples at substantially all spoke locations, wherein the spokes are spaced evenly around a track of the optical disk.

17. A method as in claim 16, wherein the step of sampling a first texture further comprises the step of recording samples at a subset of the spoke locations spaced around a track of the optical disk.

18. A method as in claim 13, wherein the step of taking a plurality of samples further comprises the step of recording a first track signal at a plurality of positions along the first sample track location.

19. A method as in claim 18, wherein the step of recording a first track signal at a plurality of positions further comprises recording a first track signal at a plurality of spoke points along the first sample track location.

20. A method as in claim 18, wherein the step of recording a first track signal at a plurality of positions further comprises recording a first track signal at a plurality of points along the first sample track location, the plurality of points being spaced a predetermined distance apart.

21. A method as in claim 9, wherein the step of comparing the first texture with a second texture further comprises the step of recording a second track signal at a plurality of positions along the second sample track location.

22. A method as in claim 21, wherein the step of comparing the first texture with a second texture further comprises the steps of:
    finding a difference between each first track signal at a spoke position and each second track signal at the same spoke position; and
    squaring each difference and adding the difference to a local mean squared error.

23. A method as in claim 22, wherein the step of comparing the first texture with a second texture further comprises the steps of:
    finding a difference between each first track signal at a spoke position and each second track signal at the same spoke position; and
    determining an absolute value of each difference and adding the absolute value to a local mean squared error.

24. A method as in claim 22, further comprising the step of determining if the optical emitter is within a predetermined distance from the first sample track location by determining if the local mean square error is less than a predetermined value.

25. A method as in claim 22, further comprising the steps of:
    comparing the local mean square error with a predetermined threshold;
    determining a current required to keep the fine adjust sled at the second sample track location if the local mean square error at the second sample track location is less than the predetermined threshold; and
    using the second sample track location as a radial reference from which to move the fine adjust sled.

26. A method as in claim 25, further comprising the steps of:
    recording a distance between the first sample track location and a new track location where the local mean square error is less than a predetermined threshold;
    increasing a gain of a fine adjust actuator that is used to move the fine adjust sled if the distance between the first sample track location and the new track location is less than expected; and
    decreasing the gain of the fine adjust actuator if the distance between the first sample track location and the new track location is greater than expected.

27. A method as in claim 22, further comprising the steps of:
    computing the local mean square error at a plurality of sample track locations;
    comparing the local mean square error of the plurality of track locations with a predetermined threshold; and
    placing the fine adjust sled at a sample track location that corresponds with a local mean square error that is below the predetermined threshold.

28. A method as in claim 27, further comprising the steps of:
    placing the fine adjust sled at a sample track location that corresponds with a minimum local mean square error of the plurality of sample track locations if a sample track location does not have a local mean square error less than the predetermined threshold.

29. A method as in claim 9, wherein the step of moving the optical emitter with the coarse adjust sled involves moving the coarse adjust sled a set distance.

30. A method as in claim 29, wherein the step of moving the optical emitter with the coarse adjust sled involves moving a coarse adjust actuator connected to the coarse adjust sled approximately a set distance.

31. A method as in claim 30, wherein the step of moving the optical emitter with the coarse adjust actuator involves moving the coarse adjust sled approximately a set distance of 300 microns.

32. A method as in claim 30, further comprising the step of adjusting a location of a print track that is to be printed after a movement of the coarse adjust sled, the adjustment being in a direction allowing the print track to be closer to a predetermined location.

33. A method as in claim 9, wherein the step of sampling a first texture further comprises the steps of:
    emitting photons from the optical emitter toward a directed location on the optical disk;
    detecting an amplitude of the emitted photons that are reflected from the optical disk with the optical detector; and
    saving the amplitude of the photons reflected from the directed location on the optical disk to a memory device.

34. A method as in claim 9, wherein the step of sampling a first texture further comprises the steps of:
    emitting photons from a laser toward a directed location on the optical disk;
    detecting an amplitude, phase, and polarization of the emitted photons that are reflected from the optical disk with an optical detector; and
    saving the amplitude, phase, and polarization of the emitted photons reflected from the directed location on the optical disk.

35. A method for identifying a location substantially close to a sampled track location on an optical disk having a radiation responsive dye, comprising the steps of:
    sampling a first texture of the optical disk at a first sample track location on the optical disk using an optical emitter and an optical detector, said optical emitter and optical detector being connected to a fine adjust sled, said fine adjust sled being slidably connected to a coarse adjust sled;
    moving the coarse adjust sled away from the first sample track location;
    moving the fine adjust sled toward the first sample track location until the optical emitter is substantially near the first sample track location;
    sampling a second texture of the optical disk at a second sample track location on the optical disk that is near the first sample track location;
    comparing the first and second textures to determine if the optical emitter is near the first sample track location;
    determining a distance traveled by the fine adjust sled between the first sample track location and the second sample track location;
    determining an absolute position for each movement of the fine adjust sled across the optical disk according to the distance traveled and the desired number of tracks between each coarse adjust sled movement; and
    adjusting the location of the fine adjust sled according to the absolute position.

36. A means for identifying a location substantially close to a sampled track location on an optical disk having a radiation responsive dye, comprising the steps of:
    a sampling means for sampling a first texture of the optical disk at a first sample track location on the optical disk using an optical emitter and an optical detector, said optical emitter and optical detector being connected to a fine adjust sled, said fine adjust sled being slidably connected to a coarse adjust sled;

a movement means for moving the coarse adjust sled away from the first sample track location;

a second movement means for moving the fine adjust sled toward the first sample track location until the optical emitter is near the first sample track location;

a sampling means for sampling a second texture of the optical disk at a second sample track location on the optical disk that is near the first sample track location; and a comparison means for comparing the first and second textures to determine if the optical emitter is substantially near the first sample track location.

37. A system for positioning an optical labeling mechanism substantially close to a particular track of a labeling surface on an optical disk, comprising:

a positioning mechanism configured to move the optical labeling mechanism across the labeling surface on the optical disk to a plurality of locations;

a detection mechanism configured to measure textures on the optical disk at the plurality of locations; and a comparison module configured to compare the textures measured from the optical disk by the detection mechanism and to determine if the optical labeling mechanism is positioned substantially near the particular track.

38. A system as in claim 37, wherein the detection mechanism is further configured to measure a sum signal at a plurality of locations along a particular track on the optical disk.

39. A system as in claim 38, wherein the detection mechanism is further configured to measure a sum signal at a plurality of locations along a different track on the optical disk.

40. A system as in claim 39, wherein the comparison module is further configured to find a difference between each sum signal measured along the particular track and the sum signals recorded along the different track; and square each difference and add the differences to a local mean squared error.

41. A system as in claim 40, wherein the comparison module is further configured to:

determine if the optical labeling mechanism is within a predetermined distance from the particular track by determining if the local mean square error is less than a predetermined value.

42. A system as in claim 41, wherein the positioning mechanism is further configured to move the optical labeling mechanism to an adjacent track if the local mean square error is greater than a predetermined value.

43. A system for identifying a location substantially close to a sampled track location on an optical disk having a radiation responsive dye, comprising:

an optical labeling module;

a fine adjust sled configured to move the optical labeling module in substantially small increments across the optical disk;

a coarse adjust sled configured to move the fine adjust sled and optical labeling module across the optical disk; and a comparison module configured to determine if the optical labeling module is in a substantially correct location based on textures sampled by the optical labeling module.

44. A system as in claim 43, wherein the optical labeling module is configured to record a first texture on the optical disk at a plurality of locations along a first track after the fine adjust sled has made a predetermined number of movements.

45. A system as in claim 44, wherein the coarse adjust sled is further configured to make a coarse movement after the fine adjust sled has made the predetermined number of movements.

46. A system as in claim 45, wherein the fine adjust sled is configured to move to a second track substantially close to the first track after the coarse movement.

47. A system as in claim 46, wherein the optical labeling module is further configured to record a second texture on the optical disk at a plurality of locations along the second track.

48. A system as in claim 47, wherein the comparison module is further configured to:

find the difference between the textures at the first track and the textures at the second track respectively;

determine the absolute value of each difference; and add each difference to a local mean square error.

49. A system as in claim 48, wherein the comparison module is further configured to determine if the optical labeling module is substantially near the first track location, wherein the optical labeling module is determined to be substantially near if the local mean square error is less than a predetermined amount.

50. An article of manufacture, comprising:

a computer usable medium having computer readable program code means embodied therein for positioning an optical labeling mechanism substantially close to a particular track of a labeling surface on an optical disk, the computer readable program code means in the article of manufacture comprising:

computer readable program code means for positioning the optical labeling mechanism adjacent to the particular track;

computer readable program code means for measuring a first surface texture of the labeling surface using the optical labeling mechanism;

computer readable program code means for moving the optical labeling mechanism from the different track toward the particular track location;

computer readable program code means for measuring a second surface texture of the labeling surface using the optical labeling mechanism; and computer readable program code means for comparing the first and second surface textures to determine if the optical labeling mechanism is positioned substantially near the particular track.

51. An article of manufacture as in claim 50, wherein the computer readable program code means for measuring a first surface texture further comprises computer readable program code means for recording a plurality of surface textures along a first track.

52. An article of manufacture as in claim 51, wherein the computer readable program code means for measuring a second surface texture further comprises computer readable program code means for recording a plurality of surface textures along a second track.

53. An article of manufacture as in claim 52, wherein the computer readable program code means for comparing the first and second textures further comprises computer readable program code for:

calculating a difference between each of the plurality of surface textures along the first and second track respectively to form a plurality of differences;

determining an absolute value for each difference in the plurality of differences; and summing each absolute value to form a local mean square error.

54. An article of manufacture as in claim 53, wherein the computer readable program code means for comparing the first and second textures further comprises computer readable program code for determining if the local mean square error is less than a predetermined amount, wherein the optical labeling mechanism is determined to be substantially close to the first track if the local mean square error is less than the predetermined amount.

* * * * *